Gilmore & Anderson.
Mach. for Dressing Millstones.
Nº 86,297.  Patented Jan. 26, 1869.
Sheet 2,
2 Sheets.
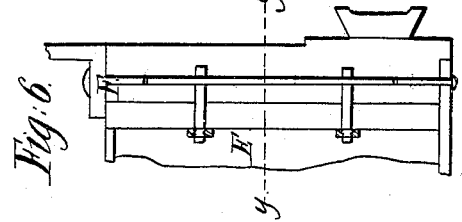
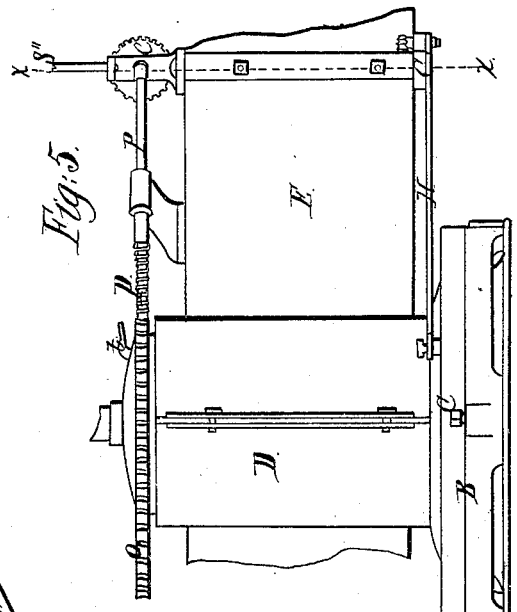
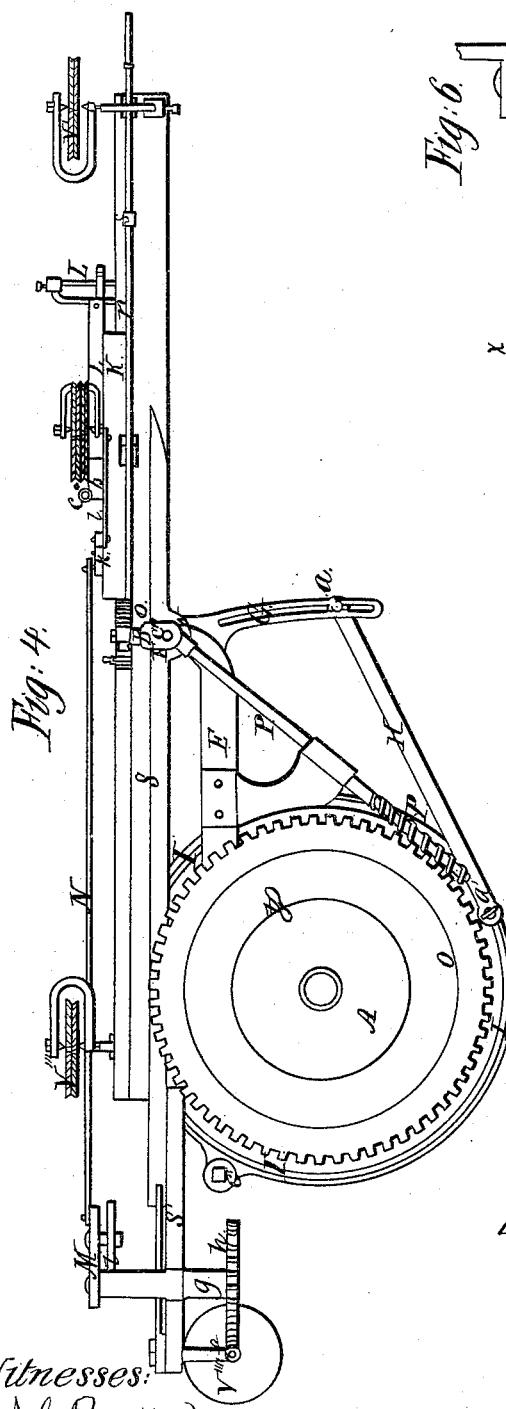
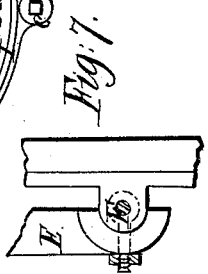
Witnesses:
Inventors:
James S. Gilmore
Leonard Anderson

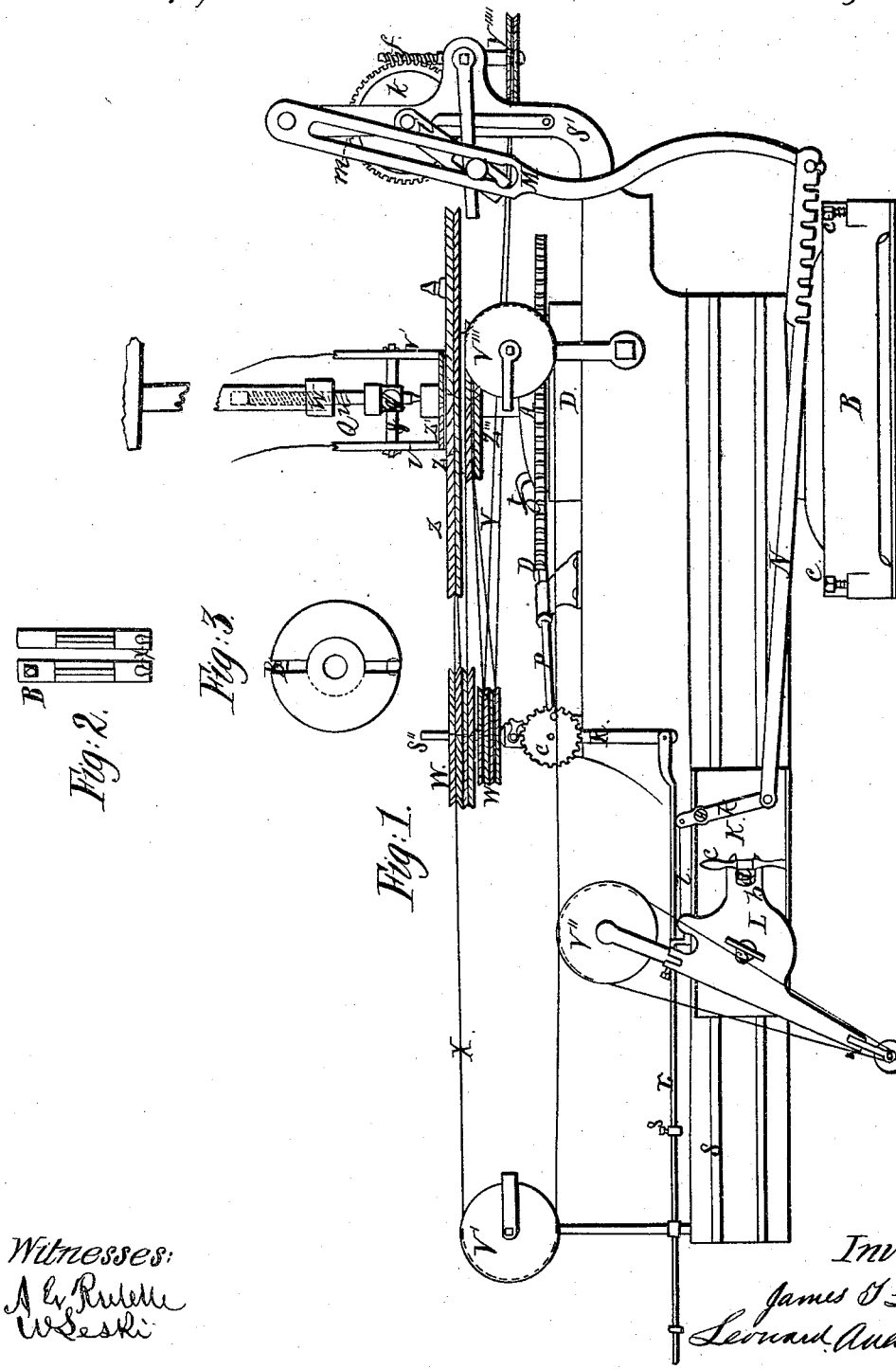

UNITED STATES PATENT OFFICE.

JAMES T. GILMORE AND LEONARD ANDERSON, OF PAINESVILLE, OHIO.

Letters Patent No. 86,297, dated January 26, 1869.

IMPROVED MACHINE FOR DRESSING MILLSTONES.

The Schedule referred to in these Letters Patent and making part of the same.

*To all whom it may concern:*

Be it known that we, JAMES T. GILMORE and LEONARD ANDERSON, of Painesville, Lake county, Ohio, have invented certain new and useful Improvements in Machines for Dressing Millstones; and we do hereby declare that the following is a full, clear, and exact description of the same, reference being had to the annexed drawings, making a part of this specification, in which—

Figure 1 is a front elevation of a millstone-dressing machine embracing our present improvements.

Figure 2, a detail view, on an enlarged scale, of the diamond-wheel or cutting-tool.

Figure 3 shows the two parts of the cutting or diamond-wheel detached.

Figure 4 is a plan view of the machine, the top pulleys and belting being removed.

Figure 5 is a rear elevation of the central part of the machine.

Figure 6, a vertical section, taken through the red line x x of fig. 5.

Figure 7, a cross-section, taken through the red line y y of fig. 6.

Our present improvements relate more especially to that class of millstone-dressing machines as secured by Letters Patent of October 28, 1862, to James T. Gilmore, and embracing the additional improvements subsequently secured to James T. Gilmore by Letters Patent of May 20, 1863.

The main object of our invention is to obtain machines by which the work of "surfacing," fine-dressing, or "cracking" a millstone, is wholly performed automatically, the machine being made susceptible of various adjustments, to produce, with mathematical precision, the lines of dressing at any desired distance from each other, and in such direction as should be deemed most advisable, to correspond to the varying "quartering," or furrows, of different millstones; and Our invention consists—

First, in the manner of arranging and mounting the arm which supports the sliding tool-stock, in combination with regulating-guides, whereby the said arm may be adjusted in various ways, so as to cause it (the arm) to be moved, by the feed-gear of the machine, either concentrically, or in parallel or diverging lines, as may be desired.

Second, in the arrangement and adaptation, to the arm supporting the sliding tool-holder, of a feed-gear, to move said arm, in combination with an adjustable feeder, to be operated by the sliding movement of the tool-holder, in such a manner that, when the tool has completed its full sliding movement, forward and back, the supporting-arm is caused to advance a certain distance, and so on at the end of each completed reciprocating movement of the sliding tool, the adjustable feeder allowing of an exact regulating the distance which it is desired the arm should advance.

Third, in the manner of mounting the tool-stock to the tool-holding slide, so that the elevation of the cutting-tool may, at any time, be regulated with precision and accuracy.

Fourth, in the peculiar arrangement for communicating a reciprocating motion to the tool-stock, in combination with a connecting-lever, whereby the tool is caused to be slightly elevated during its back-sliding movement, so as to clear the work.

Fifth, in the arrangement and combination of devices for communicating a longitudinal reciprocating motion to the tool-stock, in such a manner that, while the tool-stock is made to slide forward with a steady and regular motion, in sliding backward it is made to move with considerably-increased rapidity, so as to economize the time when the tool is not operating.

Sixth, in the peculiar adaptation and arrangement of pulleys to communicate, by proper belting, a reciprocating and a revolving motion to the cutting-tool, said pulleys being so combined that the belting on them will adjust itself to correspond to the variations in the relative position of the pulleys while the tool-supporting arm is being revolved or moved laterally, in order that a regular and continuous motion of the tool be secured and maintained, no matter what position the supporting-arm is caused to assume.

Seventh, in the manner of firmly steadying and holding the millstone-dressing machine in place, by means of a prop, fitted, at its lower end, in a socket-nut, mounted on a vertical screw, which is made to fit on the top of the journal of the machine, the whole being so arranged that, by turning the vertical propping-screw, the prop, which is made to rest against some timber of the building, can be properly adjusted, to hold firmly the machine in its proper place, preparatory to its being put in operation upon a stone Eighth, in the arrangement, in combination with the propping-screw, of two friction-pulleys, mounted on an adjustable bracket, for the purpose of providing ready means for communicating motion to the machine from the motive-power of a mill.

Ninth, in the peculiar construction of the revolving wheel or disk which holds the diamond used as the cutting-tool, so as to enable readily to insert and properly to adjust a diamond, and to hold and maintain it firmly in place during the operation of cutting.

To enable others skilled in the art to make and use our invention, we will now proceed to describe its construction and operation.

In the accompanying drawings—

B represents the base of the machine, supported on short legs, provided with set-screws, C, to properly level the machine.

This base supports the hollow upright journal or shaft A, which is enclosed by the sleeve D, mounted on a suitable shoulder.

The sleeve D is provided with a strong bracket, E, to the outer end of which is mounted, by the joint F, the tool-supporting arm S.

This arm, carrying the sliding tool, is essentially of similar construction and application as described and claimed in the patent of James T. Gilmore, of October 28, 1862; but, in our present machine, the arm is mounted by a hinge-joint, located at or near its middle part.

From the lower part of the arm S, immediately underneath the hinge-joint F, extends backward a curved slotted guide, G, with which is made to engage a set-screw, $a$, engaged to one end of the trammel-bar H, the other end of which is held by the set-screw $a^1$, in the circular groove I, on the base of the machine.

By adjusting the trammel-bar in the guides G and I, by means of the set-screws $a$ and $a'$, the line of direction of the movement of the arm S may be regulated, as will be hereafter more fully set forth.

The tool-stock L, which is pivoted to the slide K, has a forked projection, $b$, which engages with the eccentric, $d$, suitably mounted on the slide K.

By turning the eccentric, $d$, by means of the handle $c$, the tool-stock is slightly elevated or depressed, as may be required for a proper adjustment of the tool.

The arm S is provided, on its inner end, with an upward-projecting frame, $S^1$, for the support of the gear by which a reciprocating motion is communicated to the sliding tool.

The upright worm $f$, to which motion is imparted by a belt passing over the pulley $V^4$, gears into the cogged wheel $h$, the shaft $g$ of which extends forward, and is provided with the crank $i$, which is made to play in the slot $m$ of the vibrating-bar M, suspended to the frame $S^1$ above the crank $i$.

The lower end of the vibrating-bar M is connected, by means of the rod N, with one arm of the lever $k$, mounted on the slide K.

The other short arm of the lever is placed in connection, by the short connecting-rod $l$, with the tool-stock L.

When the connecting-rod N pulls inward, the lever $k$ presses the end of the tool-stock downward; but, when the tool-slide is pushed backward, the short arm of the lever $k$, first pulling at the upper end of the tool-stock L, will cause it slightly to revolve on its pivot, $e$, so as to lift sufficiently the end of the tool to clear the work.

The vibrating-bar M is caused to swing with increased velocity when the crank $i$ passes in the upper part of the slot $m$, and acts on a short leverage, and its swinging movement is considerably slower when the crank is passing the lower portion of the slot $m$, acting on a longer leverage.

During the slow movement of the vibrating-bar, the tool is pulled forward at a uniform rate, while the accelerated motion of the vibrating-bar pushes the tool back, so that the tool, while operating forward, is made to move uniformly, and in returning, and off the work, it moves with increased rapidity.

On the upper part of the shaft A, immediately above the sleeve D, is mounted a cog-wheel, O, to engage with the worm P, the shaft $p$ of which is connected, by means of a universal joint, $n$, with the ratchet-wheel $o$.

The worm P is supported in suitable bearing secured to the sleeve D.

The ratchet-wheel $o$ is operated by pawl-lever R, the long arm of which is connected with the feeding-rod $r$, arranged to play parallel with the line of movement of the tool-slide K; and it is provided with an adjustable stop, $s$, to regulate the length of its stroke.

When the machine is in operation, the slide K, as it moves backward, strikes the stop $s$, and pushes along the feeding-rod $r$, which, acting upon the pawl-lever R, causes the latter to impart a partial rotary movement to the ratchet-wheel $o$. On the slide K moving again forward, the feeding-rod $r$ is disengaged, and the pawl-lever assumes its normal position.

By adjusting the stop $s$, the length of the movement of the feeding-rod $r$ may be regulated, by which adjustment the extent of the partial rotation or revolution of the ratchet-wheel, at each full reciprocating movement of the tool-stock, is also determined.

At each partial rotation of the ratchet-wheel $o$, the worm P, with its shaft $p$, performs a corresponding part revolution, and, as the worm is made to engage with a stationary cog-wheel, O, the former will be caused, by its rotation, to advance forward on the cog-wheel, and thereby imparting a corresponding rotary movement to the sleeve D, with its bracket supporting the arm S.

The direction in which it is desired the arm S should move forward after every full reciprocating movement of the tool, whether in parallel or in converging or diverging lines, may be regulated, by the two set-screws, $a$ and $a'$, of the trammel-bar H, in the following manner, to wit:

By loosening both set-screws, to move freely in the guides, the arm S will move forward in concentric or converging lines; by tightening the set-screw $a'$ on the circular guide I, and also tightening the set-screw $a$ about the middle of the guide-slot G, the arm will advance in parallel lines; whilst, in tightening the set-screw $a$ at points toward the end of the guide-slot G, the arm will be thrown forward in diverging lines.

When it is desired to turn the arm S, and set it in a new position, the tightening-screw $t$ is disengaged, and the cog-wheel O is allowed to slip over the shaft A, while turning or revolving the arm S. By tightening again the screw $t$, the cog-wheel is set firmly on the shaft A, and the arm will again be operated by the feed-gear, as hereinbefore described.

Q represents the prop, which is made to rest against the timber of the building.

The lower end of this prop is fitted into the socket-nut $u$, mounted on the vertical screw $w$, which is to be fitted on the upper prolongation of the journal of the machine.

The prop Q, at its lower end, has a suitable bore, to allow a free movement of the upper end of the screw $w$.

When the prop is placed in position, by turning the propping-screw $w$, by means of a wrench, the prop will press down firmly the machine to the stone, and maintain it in position while at work.

The lower end of the propping-screw $w$ is made smooth, and on it is mounted the supporting-bracket $q$, at the outer end of which are arranged two vertical friction or guide-pulleys, U U'.

This bracket, with the guide-pulleys, may be revolved around the propping-screw; and the screw $q'$ serves the purpose of adjusting it in any desired position.

Z is the main driving-pulley of the machine, mounted on a stud, A', extending from the journal or shaft A. It properly consists of three pulleys, $z^1$ $z^2$ $z^3$, of different diameter, one above the other, all connected together.

The upper and smallest one, $z^1$, is to be connected, by proper belting, passing over the two vertical friction and guide-pulleys U U', with the motive-power of a mill.

The middle largest disk, $z^2$, serves to communicate, by means of the belting X, passing over the pulleys $V^1$, $V^2$, and $V^3$, a rapid revolving motion to the shaft L', which carries the revolving tool.

The lower pulley, $z^3$, communicates motion, by means of the belting Y, to the pulley $V^4$, which is firmly mounted on the shaft of the worm $f$, by means of which a reciprocating motion is communicated to the tool, as stated.

At the end of the bracket E, immediately above the joint F, on which the arm S is mounted, is arranged a vertical stud, $S^2$, to hold the two horizontal double pulleys, W and W', one above the other.

Over the upper double pulley, W, is made to pass the belting, X, from the pulley $z^2$; and over the lower double pulley, W', the belting, Y, from the pulley $z^3$ passes, as fully illustrated in fig. 1 of the drawing.

The object of this peculiar arrangement and adaptation of the two additional pulleys, W and W', mounted on the pivot-line of the arm S, is to compensate the belting that passes over the driving-pulleys $z^2$ and $z^3$, when the relative distance from them of the pulleys $V^1$, $V^2$, $V^3$, and $V^4$, is changed by the forward movement of the arm S, on which the latter are mounted.

By these compensating double pulleys W and W', the two beltings are caused to adjust themselves properly, in the measure as the arm S changes its position, and thereby an even tension of the belting is, all the time, secured.

In our machine, it is contemplated to use, as the cutting-tool, a revolving wheel or disk, armed with a diamond or diamonds, as described and claimed in the Letters Patent issued to James T. Gilmore on the 20th of May, 1863.

Experience has fully demonstrated the practical difficulty in properly mounting a diamond, and the great trouble in readjusting it after it has worked itself loose by the operation of the machine.

In figs. 2 and 3 is represented our improved construction of the revolving diamond-tool or wheel. It is made of two halves or parts, made to fit together by a central annular disk, the one half being provided with an interior annular disk, and the other half has, on its face, two corresponding outer annular disks, a sufficient free space being left between the two for the reception of the inner annular disk of the other half.

Fig. 2 illustrates the construction of the two halves of the wheel.

On the facer-face, and near the periphery of each of the two halves, is formed a depression, $\alpha$, for the reception of the diamond. On the opposite, a small set-screw, $\beta$, is suitably arranged in one of the two halves of the wheel.

The two halves being fitted together, and the annular disk slipped over the shaft, the diamond is placed in the groove or depression $\alpha$, and the set-screw $\beta$, on the opposite end of the wheel, is made to press together the two faces of the wheel, to keep the diamond firmly in position.

This arrangement presents ready means for inserting and readjusting a diamond whenever required, and it dispenses with the expensive and troublesome modes of mounting the diamond-stone, as heretofore practised.

The set-screw $\beta$ serves, also, the purpose of securing the wheel on the shaft firmly in place.

In lieu of the set-screw $\beta$, a wedge, or other equivalent device, may be substituted.

Having thus described our invention,

What we claim as new, and desire to secure by Letters Patent, is—

1. The swinging tool-supporting arm S, when mounted, by a hinge-joint, located near the middle part of said arm, to a bracket, E, or projecting frame of the machine, as and for the purpose specified.

2. The worm P, when mounted on the revolving sleeve D, and engaging with a stationary cog-wheel, O, on the shaft A, in the manner and for the purpose substantially as specified.

3. In combination with the tool-supporting arm S, the stationary cog-wheel O, worm P, ratchet-wheel $o$, pawl-lever R, and feeding-rod $r$, or their equivalents, arranged and operating substantially as set forth, for the purpose of automatically advancing the tool-supporting arm at the completion of a full reciprocating movement of the cutting-tool, as specified.

4. The forked projection of the tool-stock L, in combination with the eccentric, $d$, with its handle, $c$, arranged and operated substantially as set forth, for the purpose of regulating and adjusting the elevation of the tool, as specified.

5. The manner of alternately pressing down and raising the end of the tool, by the pull and push of the reciprocating movement, substantially as described, and for the purpose specified.

6. In combination with the tool-supporting arm S, the guides G and I and trammel-bar H, with its set-screws $a$ and $a'$, when arranged substantially as set forth, for the purpose of regulating the line of movement of the tool-supporting arm S, as specified.

7. In combination with the sliding tool-stock, the arrangement of the worm $f$, cog-wheel $h$, crank $i$, vibrating slotted bar M, and connecting-rod N, when constructed and operated substantially as described, for the purpose of communicating to the tool-stock a uniform forward movement, and causing it to move backward with considerably-accelerated speed, as specified.

8. The arrangement of the two compensating double pulleys W and W', placed on the pivot-line of the tool-supporting arm S, in the manner and for the purpose substantially as set forth.

9. The prop Q, in combination with the socket-nut $u$ and screw $w$, when arranged and adapted in the manner and for the purpose as specified.

10. The two guide-pulleys U and U', upon the adjustable bracket $q$, when mounted and arranged above the pulley Z, in the manner and for the purpose as set forth.

11. Making the diamond-wheel in two halves, connected by a central annular disk, as described, and provided with a groove or depression, $\alpha$, on the inner faces, near the periphery, for the reception of a diamond, and having a set-screw, $\beta$, between the faces, at the opposite end, by means of which the diamond is firmly adjusted in place, when the wheel is mounted on a shaft, in the manner substantially as set forth.

JAMES T. GILMORE.
LEONARD ANDERSON.

Witnesses:
ARTHUR SHEPHERD,
W. W. KIRBY.